US008239580B2

(12) United States Patent
Hausman et al.

(10) Patent No.: US 8,239,580 B2
(45) Date of Patent: *Aug. 7, 2012

(54) PROGRAMMED I/O ETHERNET ADAPTER WITH EARLY INTERRUPTS FOR ACCELERATING DATA TRANSFER

(75) Inventors: Richard Hausman, Soquel, CA (US); Paul William Sherer, Sunnyvale, CA (US); James P. Rivers, Sunnyvale, CA (US); Cynthia Zikmund, Boulder Creek, CA (US); Glenn W. Connery, Sunnyvale, CA (US); Niles E. Strohl, Tracy, CA (US); Richard S. Reid, Mountain View, CA (US)

(73) Assignee: U.S. Ethernet Innovations, LLC, Tyler, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/939,604

(22) Filed: Nov. 4, 2010

(65) Prior Publication Data

US 2011/0047302 A1 Feb. 24, 2011

Related U.S. Application Data

(60) Continuation of application No. 09/488,942, filed on Jan. 21, 2000, now Pat. No. 7,899,937, which is a continuation of application No. 09/028,088, filed on Feb. 23, 1998, now Pat. No. 6,112,252, which is a continuation of application No. 08/503,797, filed on Jul. 18, 1995, now Pat. No. 5,872,920, which is a continuation of application No. 08/374,491, filed on Jan. 17, 1995, now Pat. No. 5,485,584, which is a division of application No. 07/907,946, filed on Jul. 2, 1992, now Pat. No. 5,412,782.

(51) Int. Cl.
*G06F 15/16* (2006.01)
*G06F 3/00* (2006.01)
*G06F 9/44* (2006.01)
*G06F 9/46* (2006.01)
*G06F 13/00* (2006.01)

(52) U.S. Cl. .......... 709/250; 719/321; 719/327
(58) Field of Classification Search .......... 709/250; 719/321, 327
See application file for complete search history.

(56) References Cited

U.S. PATENT DOCUMENTS 3,786,432 A 1/1974 Woods
(Continued)

FOREIGN PATENT DOCUMENTS

EP 0 288 636 11/1988
(Continued)

OTHER PUBLICATIONS

82355 EISA BMIC Application Brief—Jan. 1990, Intel.
(Continued)

*Primary Examiner* — Aaron Strange
(74) *Attorney, Agent, or Firm* — Withrow & Terranova, PLLC

(57) ABSTRACT

In a Local Area Network (LAN) system, an Ethernet adapter exchanges data with a host through programmed I/O (PIO) and FIFO buffers. The receive PIO employs a DMA ring buffer backup so incoming packets can be copied directly into host memory when the PIO FIFO buffer is full. The adapter may be programmed to generate early receive interrupts when only a portion of a packet has been received from the network, so as to decrease latency. The adapter may also be programmed to generate a second early interrupt so that the copying of a large packet to the host may overlap reception of the packet end. The adapter to begin packet transmission before the packet is completely transferred from the host to the adapter, which further reduces latency. The minimal latency of the adapter allows it to employ receive and transmit FIFO buffers which are small enough to be contained within RAM internal to an Application Specific Integrated Circuit (ASIC) containing the transceiver, ethernet controller, FIFO control circuitry and the host interface as well.

7 Claims, 8 Drawing Sheets

U.S. PATENT DOCUMENTS

| | | |
|---|---|---|
| 3,789,365 A | 1/1974 | Jen et al. |
| 3,905,025 A | 9/1975 | Davis et al. |
| 4,063,220 A * | 12/1977 | Metcalfe et al. .............. 370/462 |
| 4,138,732 A | 2/1979 | Suzuki et al. |
| 4,250,546 A | 2/1981 | Boney et al. |
| 4,254,462 A | 3/1981 | Raymond et al. |
| 4,258,418 A | 3/1981 | Heath |
| 4,261,035 A | 4/1981 | Raymond |
| 4,349,872 A | 9/1982 | Fukasawa |
| 4,418,384 A | 11/1983 | Holtey et al. |
| 4,447,878 A | 5/1984 | Kinnie et al. |
| 4,455,606 A | 6/1984 | Cushing et al. |
| 4,471,427 A | 9/1984 | Harris |
| 4,500,990 A | 2/1985 | Akashi |
| 4,546,467 A | 10/1985 | Yamamoto |
| 4,590,467 A | 5/1986 | Lare |
| 4,593,281 A | 6/1986 | Lare |
| 4,604,682 A | 8/1986 | Schwan et al. |
| 4,627,052 A | 12/1986 | Hoare |
| 4,654,781 A | 3/1987 | Schwartz et al. |
| 4,667,305 A | 5/1987 | Dill et al. |
| 4,667,323 A | 5/1987 | Engdahl et al. |
| 4,672,570 A | 6/1987 | Benken |
| 4,680,581 A | 7/1987 | Kozpik et al. |
| 4,715,030 A | 12/1987 | Koch et al. |
| 4,727,538 A | 2/1988 | Furchtgott et al. |
| 4,754,399 A | 6/1988 | Yamamoto et al. |
| 4,768,149 A | 8/1988 | Konopik et al. |
| 4,768,190 A | 8/1988 | Giancarlo |
| 4,771,286 A | 9/1988 | Niessen et al. |
| 4,780,814 A | 10/1988 | Hayek |
| 4,807,117 A | 2/1989 | Itoku et al. |
| 4,823,312 A | 4/1989 | Michael |
| 4,841,435 A | 6/1989 | Papenberg |
| 4,847,752 A | 7/1989 | Akashi |
| 4,852,088 A | 7/1989 | Gulick et al. |
| 4,860,193 A * | 8/1989 | Bentley et al. .................. 710/55 |
| 4,866,666 A | 9/1989 | Francisco |
| 4,907,225 A | 3/1990 | Gulick |
| 4,947,366 A | 8/1990 | Johnson |
| 4,949,333 A | 8/1990 | Gulick |
| 4,951,280 A | 8/1990 | McCool et al. |
| 4,959,779 A | 9/1990 | Weber et al. |
| 4,969,164 A | 11/1990 | Mehta et al. |
| 4,987,535 A | 1/1991 | Takayama |
| 5,014,186 A | 5/1991 | Chisholm |
| 5,043,981 A | 8/1991 | Firoozmand et al. |
| 5,048,012 A | 9/1991 | Gulick et al. |
| 5,058,051 A | 10/1991 | Brooks |
| 5,088,091 A | 2/1992 | Schroeder |
| 5,101,402 A | 3/1992 | Chin et al. |
| 5,101,477 A | 3/1992 | Casper et al. |
| 5,103,446 A | 4/1992 | Fischer |
| 5,113,369 A | 5/1992 | Kinoshita |
| 5,119,374 A | 6/1992 | Firoozmand et al. |
| 5,121,390 A | 6/1992 | Farrell et al. |
| 5,121,479 A | 6/1992 | O'Brien |
| 5,125,080 A | 6/1992 | Pleva et al. |
| 5,133,062 A | 7/1992 | Joshi et al. |
| 5,133,078 A | 7/1992 | Minassian et al. |
| 5,136,582 A | 8/1992 | Firoozmand |
| 5,142,635 A | 8/1992 | Saini |
| 5,146,595 A | 9/1992 | Fujiyama et al. |
| 5,159,447 A | 10/1992 | Haskell |
| 5,161,228 A | 11/1992 | Yasui et al. |
| 5,168,561 A | 12/1992 | Vo |
| 5,170,477 A | 12/1992 | Potter et al. |
| 5,175,732 A | 12/1992 | Hendel |
| 5,179,671 A | 1/1993 | Kelly et al. |
| 5,179,704 A | 1/1993 | Jibbe et al. |
| 5,179,709 A | 1/1993 | Bailey |
| 5,185,876 A | 2/1993 | Nguyen et al. |
| 5,193,195 A | 3/1993 | Mayazaki |
| 5,195,093 A | 3/1993 | Tarrab et al. |
| 5,210,749 A * | 5/1993 | Firoozmand .................. 370/463 |
| 5,210,829 A | 5/1993 | Bitner |
| 5,235,595 A | 8/1993 | O'Dowd |
| 5,247,626 A | 9/1993 | Firoozmand |
| 5,249,271 A | 9/1993 | Hopkinson |
| 5,265,228 A | 11/1993 | Beaudoin et al. |
| 5,274,763 A | 12/1993 | Banks |
| 5,276,891 A | 1/1994 | Patel |
| 5,278,956 A | 1/1994 | Thomsen et al. |
| 5,283,904 A | 2/1994 | Carson et al. |
| 5,289,579 A | 2/1994 | Punj |
| 5,293,487 A | 3/1994 | Russo et al. |
| 5,297,139 A | 3/1994 | Okura et al. |
| 5,297,242 A | 3/1994 | Miki |
| 5,299,313 A | 3/1994 | Petersen et al. |
| 5,307,345 A | 4/1994 | Lozowick et al. |
| 5,307,459 A | 4/1994 | Petersen et al. |
| 5,313,582 A * | 5/1994 | Hendel et al. .................. 710/56 |
| 5,319,752 A | 6/1994 | Petersen et al. |
| 5,329,622 A | 7/1994 | Belsan et al. |
| 5,349,667 A | 9/1994 | Kaneko |
| 5,377,184 A | 12/1994 | Beal et al. |
| 5,390,299 A | 2/1995 | Rege |
| 5,412,780 A | 5/1995 | Rushton |
| 5,412,782 A | 5/1995 | Hausman et al. |
| 5,434,872 A | 7/1995 | Petersen et al. |
| 5,440,690 A | 8/1995 | Rege |
| 5,452,420 A | 9/1995 | Engdahl |
| 5,469,545 A | 11/1995 | Vanbuskirk |
| 5,479,613 A | 12/1995 | Geyer et al. |
| 5,485,584 A | 1/1996 | Hausman et al. |
| 5,487,152 A | 1/1996 | Young |
| 5,488,724 A | 1/1996 | Firoozmand |
| 5,515,523 A | 5/1996 | Kalkunte et al. |
| 5,530,874 A | 6/1996 | Emery et al. |
| 5,602,995 A | 2/1997 | Hendel |
| 5,687,314 A | 11/1997 | Osman et al. |
| 5,696,899 A * | 12/1997 | Kalwitz ....................... 709/228 |
| 5,732,094 A | 3/1998 | Petersen et al. |
| 5,740,467 A | 4/1998 | Chmielecki et al. |
| 5,740,468 A | 4/1998 | Hirose |
| 5,774,640 A | 6/1998 | Kurio |
| 5,872,920 A | 2/1999 | Hausman et al. |
| 5,917,629 A | 6/1999 | Hortensius et al. |
| 6,112,252 A | 8/2000 | Hausman et al. |

FOREIGN PATENT DOCUMENTS

| | | |
|---|---|---|
| EP | 0 290 129 A3 | 11/1988 |
| EP | 0 378 422 A2 | 1/1990 |
| EP | 0150084 B1 | 5/1991 |
| JP | 52-055343 | 5/1977 |
| JP | 59-167754 | 9/1984 |
| JP | 60-110060 | 6/1985 |
| JP | 61-058037 | 3/1986 |
| JP | 61-264465 | 11/1986 |
| JP | 62-082422 | 4/1987 |
| JP | 63-81553 | 8/1988 |
| JP | 01-214939 | 8/1989 |
| JP | 3-58543 | 3/1991 |
| JP | 04-145560 | 5/1992 |
| JP | 04-155534 | 5/1992 |
| WO | WO 92/21081 | 11/1992 |

OTHER PUBLICATIONS

Am7990 Local Area Network Controller for Ethernet (LANCE), Advanced Micro Devices, Jun. 1990, Rev. C., AMD.

Brodnax, T. et al., "Fast Counter and Comparator for Data Transfers," IBM Technical Disclosure Bulletin, Aug. 1991, pp. 322-324, IBM.

Cooper, Eric et al., "Host Interface Design for ATM LANs," Proceedings of the 16th Conference on Local Computer Networks, Oct. 14-17, 1991, IEEE.

Info World, May 20-27, 1981, vol. 13, Issues 20 and 21.

MC68302 Integrated Multi-Protocol Processor User's Manual, Motorola, 1989, Motorola.

MC68302 Integrated Multiprotocol Processor User's Manual, Motorola, 1991, Motorola.

Microcommunications, Intel, 1991, Intel.

Microcommunications, Intel, 1992, Intel.

Microcommunications Handbook, Intel, Oct. 25, 1985, Intel.

Katz, Randy H., High performance Network and Channel-Based Storage, Sep. 27, 1991, UC Berkeley EECS Technical Reports.

Katz, Randy H., "Network-Attached Storage Systems," Proceedings of the Scalable High Performance Computing Conference (SHPCC-92), Apr. 26-29, 1992, pp. 68-75, IEEE.
Keener, DS, "Maximizing Direct Memory Access Efficiency in Multi-Master Bus Systems," IBM Technical Disclosure Bulletin, May 1988, pp. 211-212, IBM.
Microcomputer Solutions, Jul./Aug. 1991, Intel Corporation.
Motorola MC68605 X.25 Protocol Controller User's Manual, 1992, Motorola.
PCSA DEPCA Hardware Reference Manual, Apr. 1989, Digital Equipment Corporation.
SEEQ 8001 EDLC Ethernet Data Link Controller, Dec. 1982, Preliminary Data Sheet, SEEQ Technology, Incorporated.
The SUPERNET Family for FDDI Databook, 1989, Advanced Micro Devices.
Invalidity Contention from Case No. 6:09-CV-448-JDL, served on Jun. 4, 2010.
The Implementation of Ethernet/IEEE 802.3 in VLSI; Coleman et al.; 8079A Mini-Micro Conference Record Nov. 8-11, 1983, San Francisco, CA, USA; pp. 1-18.
Universal Network Device Interface Protocol (UNDIP) Hemant Kanakia Computer Systems Laboratory Stanford University; David Cheriton Computer Science Department Stanford University; CH2613-8/88/0000/0301/$01.00© 1888 IEEE; pp. 301-309.
IBM Technical Disclosure Bulletin vol. 25, No. 9, Feb. 1983; Early Interrupt for Disk Controller; W.J. Brooks, W.B. Ott, D.C. Pavek and G.E. Webb; 1 page.
The VMP Network Adapter Board (NAB); High Performance Network Communication for Multiprocessors; Hemant Kanakia Computer Systems Laboratory Stanford University; David Cheriton Computer Science Department Stanford University; 1988 ACM 0-89791-279-988/008/0175 $1.50; pp. 175-187.
Partial European Search Report dated Oct. 31, 1994 ; European Patent Application No. 93110478.0.
Interfacing to Ethernet Using VLSI Protocol Chips; R.W. Dobinson, K.G. Konigsfeld & N.D. Szpak; Interfaces in Computing 3 (1985) 173-187; pp. 173-185.
European Search Report dated Jun. 1, 1995 ; European Patent Application No. 93110478.0.
Office Action dated Mar. 24, 1998; European Patent Application No. 93110478.0.
Office Action dated Oct. 8, 1996; Japanese Patent Application No. 157562/1993.
Translation of Pending Claims from Japanese Patent Application No. 157562/1993.
Letter to Fukami Patent Office dated Jan. 6, 1997; related to Japanese Patent Application No. 157562/1993.
Final Office Action dated Jun. 26, 1997; Japanese Patent Application No. 157562/1993.
Translation of Office Action dated Sep. 1, 2008; Japanese Patent Application No. 2005-282538.
IBM Technical Disclosure Bulletin, Feb. 1983; vol. 25, NR: 9; PG: 4703; Early Interrupt for Disk Controller; 2 pages.
Translation of Office Action dated Mar. 15, 2004; Japanese Patent Application No. 6-504767.
Supplementary European Search Report dated May 10, 1994 ; European Patent Application No. 93918424.8.
Office Action dated Feb. 12, 1996; European Patent Application No. 93918424.8.
Response to Feb. 12, 1996 Office Action dated Sep. 25, 1997; European Patent Application No. 93918424.8.
PCT International Search Report dated Dec. 7, 1993; PCT Application No. PCT/US93/07060.
Office Action dated May 16, 2000; Canadian Patent Application No. 2,119,151.
Response to May 16, 2000 Office Action dated Sep. 18, 2000; Canadian Patent Application No. 2,119,151.
Translation of Office Action dated Dec. 25, 2001; Japanese Patent Application No. 6-518024.
Translation of Office Action dated Jul. 31, 2001; Japanese Patent Application No. 6-518024.
Supplementary European Search Report dated May 17, 1995 ; European Patent Application No. 93921684.2.
Response to Jan. 27, 2000 Office Action dated May 29, 2000; Canadian Patent Application. No. 2,143,951.
Office Action dated Aug. 11, 1994; Australian Patent Application No. 47881/93.
Response to Aug. 11, 1994 Office Action dated Aug. 10, 1995; Australian Patent Application No. 47881/93.
Office Action dated Sep. 4, 1995; Australian Patent Application No. 47881/93.
Response to Sep. 4, 1995 Office Action dated Dec. 11, 1995; Australian Patent Application No. 47881/93.
PCT Written Opinion dated Apr. 20, 1995; PCT Application No. PCT/US93/12652.
Response to PCT Written Opinion dated Apr. 20, 1995; filed May 3, 1995; PCT Application No. PCT/US93/12652.
Office Action dated Nov. 23, 1995; Australian Patent Application No. 59873/94.
Response to Nov. 23, 1995 Office Action dated Nov. 27, 1996; Australian Patent Application No. 59873/94.
Translation of Office Action dated Oct. 1, 2001; Japanese Patent Application No. 6-504758.
Applicant's Comments Regarding Office Action dated Oct. 1, 2001; Japanese Patent Application No. 6-504758.
Office Action dated Dec. 11, 1996; European Patent Application No. 93918428.9.
Response to Office Action dated Dec. 11, 1996; filed Jun. 24, 1997; European Patent Application No. 93918428.9.
Office Action dated Mar. 5, 1999; European Patent Application No. 93918428.9.
Response to Office Action dated Mar. 5, 1999; filed Jan. 24, 2000; European Patent Application No. 93918428.9.
Entry into the regional phase before the EPO as designated or elected Office derived from PCT/US93/07027; European Patent Application No. 93918401.6.
Pending Claims from European Patent Application No. 93918401.6.
Office Action dated Mar. 23, 1998; European Patent Application No. 93918401.6.
Response to Mar. 23, 1998 Office Action; filed Apr. 8, 1998; European Patent Application No. 93918401.6.
Office Action dated May 30, 1997; European Patent Application No. 93918401.6.
Response to May 30, 1997 Office Action; filed Jan. 15, 1998; European Patent Application No. 93918401.6.
Supplementary European Search Report dated May 13, 1994; European Patent Application No. 93918401.6.
Complaint for Patent Infringement—*U.S. Ethernet Innovations, LLC* (Plaintiff) vs. *Acer, Inc.* (Defendant)—Civil Action File No. 6:09cv448 (pp. 1-37)—Filed Oct. 9, 2009 USDC ED TX.
Answer & Counterclaim of Defendant Dell Inc.—*U.S. Ethernet Innovations, LLC* (Plaintiff) vs. *Acer, Inc.* (Defendant)—Civil Action File No. 6:09cv448 (pp. 1-78)—Filed Dec. 17, 2009 USDC ED TX.
Declaration of Inventors Under 37 C.F.R. §1.131 (including Exhibits 1-3)—U.S. Appl. No. 07/920,893, filed Jul. 28, 1992.
Office Action dated Sep. 20, 1994 issued in co-owned U.S. Appl. No. 08/012,561, filed Feb. 2, 1993.
Response to Office Action dated Sep. 20, 1994, filed Feb. 9, 1995, in co-owned U.S. Appl. No. 08/012,561, filed Feb. 2, 1993.
Office Action dated May 19, 1995 issued in co-owned U.S. Appl. No. 08/012,561, filed Feb. 2, 1993.
Response to Office Action May 19, 1995, filed Aug. 18, 1995, in co-owned U.S. Appl. No. 08/012,561, filed Feb. 2, 1993.
Notice of Allowance dated Nov. 14, 1995 issued in co-owned U.S. Appl. No. 08/012,561, filed Feb. 2, 1993.
Supplemental Notice of Allowability dated Mar. 13, 1996 issued in co-owned U.S. Appl. No. 08/012,561, filed Feb. 2, 1993.
Notice of Allowance dated Dec. 23, 1994, issued in co-owned U.S. Appl. No. 07/920,893, filed Jul. 28, 1992.
Office Action dated Jan. 26, 1993 issued in co-owned U.S. Appl. No. 07/947,773, filed Sep. 18, 1992.
Response to Office Action dated Jan. 26, 1993, filed Apr. 26, 1993, in co-owned U.S. Appl. No. 07/947,773, filed Sep. 18, 1992.
Office Action dated Jul. 15, 1993 issued in co-owned U.S. Appl. No. 07/947,773, filed Sep. 18, 1992.

Response to Office Action dated Jul. 15, 1993, filed Oct. 15, 1993, in co-owned U.S. Appl. No. 07/947,773, filed Sep. 18, 1992.
Notice of Allowance dated Nov. 17, 1993 issued in co-owned U.S. Appl. No. 07/947,773, filed Sep. 18, 1992.
Notice of Allowance dated Oct. 14, 1993 issued in co-owned U.S. Appl. No. 07/920,898, filed Jul. 28, 1992.
Notice of Allowance dated Sep. 21, 1993 issued in co-owned U.S. Appl. No. 07/921,519, filed Jul. 28, 1992.
PCT International Search Report dated Dec. 27, 1993 issued in co-owned international application No. PCT/US93/08866, filed Sep. 17, 1993.
PCT International Search Report dated Aug. 1, 1994 issued in co-owned international application No. PCT/US93/012652, filed Dec. 29, 1993.
PCT Written Opinion dated Apr. 20, 1995 issued in co-owned international application No. PCT/US93/012652, filed Dec. 29, 1993.
PCT International Preliminary Examination Report dated Jun. 19, 1995 issued in co-owned international application No. PCT/US93/012652, filed Dec. 29, 1993.
PCT International Preliminary Examination Report dated Jul. 12, 1995 issued in co-owned international application No. PCT/US93/012652, filed Dec. 29, 1993.
Claim Construction Order, Jan. 8, 2007, *3Com Corp. v. D-Link Systems, Inc. and Realtek Semiconductor Corp.*, Civil Action No. 03-cv-02177-VRW, and *3Com Corp. v. D-Link Systems, Inc.*, Civil Action No. 05-cv-0098-VRW, both in U.S.D.C., N.D. Ca. [Court Doc. 375, pp. 1-31].
Declaration of Inventors Under 37 C.F.R. §1.131 with three exhibits, filed Mar. 2, 1994, in co-owned U.S. Appl. No. 07/920,893, Application Date Jul. 28, 1992, USPTO.
Expert Report of Farzin Firoozmand Concerning Prior Art and Validity of Asserted Claims of U.S. Patent Nos. 5,434,872; 5,732,094; and 5,307,459, *3Com Corporation v. D-Link Systems Inc. and Realtek Semiconductor Corporation*, Civil Action No. CV-03-2177-VRW, U.S.D.C., N.D. Ca. [pp. i-42].
Exhibit 6 (Corrected) (SUPERNET 2 Family for FDDI 1991/1992 World Network Data Book), Advanced Micro Devices, Bates labels RT008835-RT009048.
Exhibit 8 (Corrected) (Intel 82596CA Data Sheet), Nov. 1989, Intel Corporation, Bates labels RT010115-010186.
Exhibit 2 (List of Materials Reviewed by Firoozmand) [6 pages].
Exhibit 11 (Schroeder '90 Article), Michael D. Schroeder, Andrew D. Birrell, Michael Burrows, Hal Murray, Roger M. Needham, Thomas L. Rodeheffer, Edwin H. Satterthwaite, Charles P. Thacker, Autonet: A High-Speed, Self-Configuring Local Area Network Using Point-to-Point Links, Apr. 21, 1990, Bates labels RT053104-RT053123.
Exhibit 12 (Frazier Article), Gregory L. Frazier and Yuval Tamir, The Design and Implementation of a Multi-Queue Buffer for VLSI Communication Switches, Computer Science Department, University of California, Los Angeles, CA, copyright 1989 IEEE, pp. 466-471, Bates labels RT053165-RT053170.
Advanced Peripherals Data Communications Local Area Networks UARTS, 1988 Edition, National Semiconductor Corporation, Bates labels RT 009310-RT 009473 [Exhibit 21 to Firoozmand Reports].
Computer Reseller News, Apr. 12, 1989, Bates labels RT 070795-RT 070796 [Exhibit 27 to Firoozmand Reports].
Intel's 82596CA Coprocessor and Data Sheet Invalidity Claim Chart, Comparison of Asserted Claims 1, 10, and 21 of 3Com's 5,434,872 patent to Intel's 82596CA Coprocessor and Data Sheet, pp. 1-12 [Exhibit 28 to Firoozmand Reports].
Electronic Engineering Times, Apr. 22, 1991, Issue 638, CMP Publication, Bates labels RT 070804-RT 070806 [Exhibit 29 to Firoozmand Reports].
FDDI System Interface User's Manual MC68839, Motorola, copuright 1994, Bates labels RT 016726-RT 016910 [Exhibit 30 to Firoozmand Reports].
Motorola's MC68839 FDDI Chip Set Invalidity Claim Chart, Comparison of Asserted Claims 1, 10, and 21 of 3Com's 5,434,872 patent to Motorola's MC68839 FDDI Chip Set [Exhibit 31 to Firoozmand Reports].
Gulick '012 Patent Invalidity Claim Chart, Comparison of Asserted Claims 1, 10, and 21 of 3Com's 5,434,872 patent, Claims 1, 9, 21, 28, 39, and 47 of 3Com's 5,732,094 patent, and Claim 1 of 3Com's 5,307,459 patent to U.S. Patent No. 5,048,012 to Gulick et al. [Exhibit 33 to Firoozmand Reports].
U.S. Patent No. 4,860,193 (Bentley) Invalidity Claim Chart, Comparison of Asserted Claims 1, 10, and 21 of 3Com's 5,434,872 patent, Claims 1, 9, 21, 28, 39, and 47 of 3Com's 5,732,094 patent, and Claim 1 of 3Com's 5,307,459 patent to U.S. Patent 4,860,193 (Bentley) [Exhibit 34 to Firoozmand Reports].
Schroeder Invalidity Claim Chart, Comparison of Asserted Claims 1, 9, 21, 28, 39, and 47 of 3Com's 5,732,094 patent to Schroeder [Exhibit 35 to Firoozmand Reports].
U.S. Patent No. 5,412,782 (Hausman) Invalidity Claim Chart, Comparison of Asserted Claims 1, 10, and 21 of 3Com's 5,434,872 patent, Claims 1, 9, 21, 28, 39, and 47 of 3Com's 5,732,094 patent, and Claim 1 of 3Com's 5,307,459 patent to U.S. Patent No. 5,412,782 (Hausman) [Exhibit 37 to Firoozmand Reports].
Mehta '164 Patent Invalidity Claim Chart, Comparison of Asserted Claim 1 of 3Com's 5,307,459 patent to Mehta 4,969,164 patent [Exhibit 39 to Firoozmand Reports].
Frazier Invalidity Claim Chart, Comparison of Asserted Claims 1 and 39 of 3Com's 5,732,094 patent to Frazier [Exhibit 40 to Firoozmand Reports].
Lozowick '345 Patent Invalidity Claim Chart, Comparison of Asserted Claims 1 and 39 of 3Com's 5,732,094 patent to Lozowick (U.S. Patent No. 5,307,345) [Exhibit 42 to Firoozmand Reports].
Expert Witness Report of Michael Mitzenmacher regarding Infringment of U.S. Patents 5,307,459; 5,434,872; 5,732,094; 6,526,446 and 6,570,884 with Exhibits G and N, *3Com Corporation v. Realtek Semiconductor Corporation*, Civil Action No. CV-03-2177-VRW, U.S.D.C., N.D. Ca.
Expert Report of Brian W. Napper, *3Com Corporation v. Realtek Semiconductor Corporation*, Civil Action No. CV-03-2177-VRW, U.S.D.C., N.D. Ca.
Realtek's Motion to Supplement Trial Exhibit List with a Document Newly Produced by a Third Party, *3Com Corporation v. D-Link Systems, Inc. and Realtek Semiconductor Corp.*, Civil Action No. CV-03-2177-VRW, U.S.D.C., N.D. Ca., Mar. 5, 2008.
Product Selector Guide, Complete Catalog of Products and Publications, Spring 1991, pages: cover, Table of contents, 1.2-7.10, Advanced Micro Devices, Bates labels AMD 00575-AMD 00621.
Realtek's Notice of Motion and Motion for Summary Judgment of Invalidity of U.S. Patent No. 5,307,459, Nov. 16, 2007, *3Com Corp. v. D-Link Systems, Inc. and Realtek Semiconductor Corp.*, Civil Action No. CV-03-2177-VRW, U.S.D.C., N.D. Ca.
Realtek's Notice of Motion and Motion for Summary Judgment of Invalidity of U.S. Patents No. 5,434,872 and No. 5,732,094, Nov. 16, 2007, *3Com Corp. v. D-Link Systems, Inc. and Realtek Semiconductor Corp.*, Civil Action No. CV-03-2177-VRW, U.S.D.C., N.D. Ca.
Declaration of Farzin Firoozmand in Support of Realtek's Alternative Motion for Summary Judgment of Invalidity of Claim 1 of the '459 Patent, Nov. 17, 2007, *3Com Corp. v. D-Link Systems, Inc. and Realtek Semiconductor Corp.*, Civil Action No. CV-03-2177-VRW, U.S.D.C., N.D. Ca. [Court Doc. 455, pp. 1-10].
Resumé of Farzin Firoozmand, Nov. 17, 2007, *3Com Corp. v. D-Link Systems, Inc. and Realtek Semiconductor Corp.*, Civil Action No. CV-03-2177-VRW, U.S.D.C., N.D. Ca. [Court Doc. 455-1, pp. 1-4].
Declaration of Farzin Firoozmand in Support of Realtek's Alternative Motion for Summary Judgment of Invalidity of the '872 and '094 Patents, Nov. 17, 2007, *3Com Corp. v. D-Link Systems, Inc. and Realtek Semiconductor Corp.*, Civil Action No. CV-03-2177-VRW, U.S.D.C., N.D. Ca. [Court Doc. 456, pp. 1-10].
Exhibit 4 to the Declaration of Farzin Firoozmand in Support of Realtek's Motion for Summary Judgment of Invalidity of U.S. Patent Nos. 5,434,872 and 5,732,094, Dec. 20, 2007, *3Com Corp. v. D-Link Systems, Inc. and Realtek Semiconductor Corp.*, Civil Action No. CV-03-2177-VRW, U.S.D.C., N.D. Ca., 7 pages.
Firoozmand I '749 Patent Invalidity Claim Chart, Comparison of Asserted Claim 1of 3Com's 5,307,459 patent to Firoozmand I 5,210,749 patent, Nov. 17, 2007, *3Com Corp. v. D-Link Systems, Inc. and Realtek Semiconductor Corp.*, Civil Action No. CV-03-2177-VRW, U.S.D.C., N.D. Ca. [Court Doc. 455-6. pp. 1-3].
Firoozmand II '724 Patent Invalidity Claim Chart for the '459 Patent, Comparison of Asserted Claim 1 of 3Com's 5,307,459 patent to Firoozmand II 5,488,724 patent, Nov. 17, 2007, *3Com Corp. v.*

*D-Link Systems, Inc. and Realtek Semiconductor Corp.*, Civil Action No. CV-03-2177-VRW, U.S.D.C., N.D. Ca. [ Court Doc. 455-7, pp. 1-3].

Firoozmand I '749 Patent Invalidity Claim Chart, Comparison of Asserted Claims 1, 10, and 21 of 3Com's 5,434,872 patent to Firoozmand I 5,210,749 patent [Court Doc. 456-7, pp. 1-6].

Firoozmand I '749 Patent Invalidity Claim Chart, Comparison of Asserted Claims 1, 9, 21, 28, 39 and 47 of 3Com's 5,732,094 patent to Firoozmand I 5,210,749 patent, Nov. 17, 2007, *3Com Corp. v. D-Link Systems, Inc. and Realtek Semiconductor Corp.*, Civil Action No. CV-03-2177-VRW, U.S.D.C., N.D. Ca. [Court Doc. 456-8, pp. 1-10].

Firoozmand II '724 Patent Invalidity Claim Chart for '872 Patent, Comparison of Asserted Claims 1, 10, and 21 of 3Com's 5,434,872 patent to Firoozmand II 5,488,724 patent, Nov. 17, 2007, *3Com Corp. v. D-Link Systems, Inc. and Realtek Semiconductor Corp.*, Civil Action No. CV-03-2177-VRW, U.S.D.C., N.D. Ca. [Court Doc. 456-9, pp. 1-7].

Firoozmand II '724 Patent Invalidity Claim Chart for the '094 Patent, Comparison of Asserted Claims 1, 9, 21, 28, 39 and 47 of 3Com's 5,732,094 patent to Firoozmand I 5,488,724 patent, Nov. 17, 2007, *3Com Corp. v. D-Link Systems, Inc. and Realtek Semiconductor Corp.*, Civil Action No. CV-03-2177-VRW, U.S.D.C., N.D. Ca. [Court Doc. 456-10, pp. 1-8].

The World Network, SUPERNET 2 chipset brings FDDI closer to desktop, Advances, front cover, pp. 1, 48, back cover, Jun. 3, 1991, Advanced Micro Devices, Bates labels AMD 00571-AND 00574 [Court Doc. 456-14, pp. 1-4].

FDDI nears the desktop, Advances, front cover, pp. 1, 14-19, Summer 1990, Advanced Micro Devices, Bates labels AMD 00563-AMD 00570 [Court Doc. 456-15, pp. 1-8].

SUPERNET 2 Chip Set and Data Sheet Invalidity Claim Chart, Comparison of Asserted Claims 1, 10, and 21 of the 5,434,872 patent to SUPERNET 2 Chip Set and Data Sheet, Nov. 17, 2007, *3Com Corp. v. D-Link Systems, Inc. and Realtek Semiconductor Corp.*, Civil Action No. CV-03-2177-VRW, U.S.D.C., N.D. Ca. [Court Doc. 456-16, pp. 1-8].

SUPERNET 2 Chip Set and Data Sheet Invalidity Claim Chart, Comparison of Asserted Claims 1, 2, 21, 28, 39, and 47 with SUPERNET 2 Chip Set and Data Sheet, Nov. 17, 2007, *3Com Corp. v. D-Link Systems, Inc. and Realtek Semiconductor Corp.*, Civil Action No. CV-03-2177-VRW, U.S.D.C., N.D. Ca. [Court Doc. 456-17, pp. 1-9].

Declaration of Farzin Firoozmand in Support of Realtek's Reply to 3Com's Opposition Realtek's Motion for Summary Judgment of Invalidity of U.S. Patent Nos. 5,307,459; 5,434,872; 5,732,094; 6,526,446; and 6,570,884, Dec. 10, 2007, *3Com Corp. v. D-Link Systems, Inc. and Realtek Semiconductor Corp.*, Civil Action No. CV-03-2177-VRW, U.S.D.C., N.D. Ca. [Court Doc. 530, pp. 1-3].

Redacted Summary Judgment Infringement / Invalidity Order, Filed Under Seal Feb. 25, 2008, *3Com Corp. v. Realtek Semiconductor Corp.*, Civil Action No. CV-03-2177-VRW, U.S.D.C., N.D. Ca. [49 pages].

Plaintiff's Reply Claim Construction Brief, Mar. 31, 2006, *3Com Corp. v. D-Link Systems Inc. and Realtek Semiconductor Corp.*, Civil Action No. CV-03-2177-VRW, U.S.D.C., N.D. Ca. [Court Doc. 340, pp. 1-28].

Deposition of Mark A. Haynes, Oct. 1, 2007, *3Com Corporation v. Realtek Semiconductor Corporation*, Civil Action No. CV-03-2177-VRW, U.S.D.C., N.D. Ca. [sheets 1-37; index pp. 1-12].

Joint Claim Construction and Prehearing Statement Pursuant to Patent L.R. 4-3, Mar. 12, 2004, *3Com Corporation v. D-Link Systems Inc.*, Civil Action No. CV-03-2177-VRW, U.S.D.C., N.D. Ca., pp. 1-13.

Exhibit A to Joint Claim Construction and Prehearing Statement Pursuant to Patent L.R. 4-3 provided by 3Com, Mar. 12, 2004, *3Com Corporation v. D-Link Systems Inc.*, Civil Action No. CV-03-2177-VRW, U.S.D.C., N.D. Ca., pp. 1-7.

Exhibit B to Joint Claim Construction and Prehearing Statement Pursuant to Patent L.R. 4-3 provided by D-Link, Mar. 12, 2004, *3Com Corporation v. D-Link Systems Inc.*, Civil Action No. CV-03-2177-VRW, U.S.D.C., N.D. Ca. [Court Doc. 69-3, pp. 1-19].

Exhibit C to Joint Claim Construction and Prehearing Statement Pursuant to Patent L.R. 4-3 (Summary of Testimony of Howard Frazier in Support of D-Link's Positions), Mar. 12, 2004, *3Com Corporation v. D-Link Systems Inc.*, Civil Action No. CV-03-2177-VRW, U.S.D.C., N.D. Ca. [Court Doc. 69-4, pp. 1-6].

Joint Claim Construction and Prehearing Statement Pursuant to Patent Local Rule 4-3, Jan. 18, 2006, *3Com Corporation v. D-Link Systems Inc. and Realtek Semiconductor Corporation*, Civil Action No. CV-03-2177-VRW, U.S.D.C., N.D. Ca. [Court Doc. 303,pp. 1-195].

Revised Joint Claim Construction and Prehearing Statement Pursuant to Patent Local Rule 4-3, Mar. 10, 2006, *3Com Corporation v. D-Link Systems Inc. and Realtek Semiconductor Corporation*, Civil Action No. CV-03-2177-VRW and *3Com Corporation v. D-Link Systems Inc.*, Civil Action No. CV-05-00098-VRW, both in U.S.D.C., N.D. Ca. [Court Doc. 72-1, pp. 1-87].

Plaintiff's Consolidated Opening Brief and Supporting Evidence for Claims Construction, *3Com Corporation v. D-Link Systems Inc. and Realtek Semiconductor Corporation*, Civil Action No. CV-03-2177-VRW and *3Com Corporation v. D-Link Systems Inc.*, Civil Action No. CV-05-00098-VRW, both in U.S.D.C., N.D. Ca. [Court Doc. 75, pp. 1-40].

Realtek Semiconductor Corporation's Responsive Claim Construction Brief (Patent Local Rule 4-5(b)), Mar. 24, 2006, *3Com Corporation v. D-Link Systems Inc. and Realtek Semiconductor Corporation*, Civil Action No. CV-03-2177-VRW, U.S.D.C., N.D. Ca. [Court Doc. 333, pp. 1-40].

Local Area Network Databook, 1992 Edition, National Semiconductor [cover; pp. 1-268 thru 1-309].

Amended Final Joint Claim Construction and Pre-Hearing Statement , Mar. 31, 2006, *3Com Corporation v. D-Link Systems Inc. and Realtek Semiconductor Corporation*, Civil Action No. CV-03-2177-VRW and *3Com Corporation v. D-Link Systems Inc.*, Civil Action No. CV-05-00098-VRW, both in U.S.D.C., N.D. Ca. [Court Doc. 338, pp. 2-60].

File History of U.S. Patent No. 5,043,981, filed May 29, 1990 as U.S. Appl. No. 07/529,366 (F. Firoozmand).

File History of U.S. Patent No. 5,210,749, filed May 29, 1990 as U.S. Appl. No. 07/529,363 (F. Firoozmand).

File History of U.S. Patent No. 5,488,724, filed May 15, 1992 as U.S. Appl. No. 07/883,748 (F. Firoozmand).

Civil Docket for Case #: 3:03-CV-02177-VRW, *3Com Corporation v. D-Link Systems, Inc.*, Civil Action No. CV-03-02177-VRW, U.S.D. C., N.D. Ca., pp. 1-64.

Realtek's Motion for Judgment as a Matter of Law or, Alternatively, a New Trial Regarding Invalidity Pursuant to Rule 50(b), *3Com Corporation v. D-Link Systems, Inc.*, Civil Action No. CV-03-02177-VRW, U.S.D.C., N.D. Ca. [Court Doc. 702, pp. 1-38].

3Com Corporation's Opposition to Realtek's Motion for Judgment as a Matter of Law or, Alternatively, a New Trial Regarding Invalidity Pursuant to Rule 50(b), *3Com Corporation v. D-Link Systems, Inc.*, Civil Action No. CV-03-02177-VRW, U.S.D.C., N.D. Ca. [Court Doc. 725, pp. 1-29].

3Com Corporation's Opposition to Realtek's Motion for Judgment as a Matter of Law Pursuant to Rule 50(b) or, Alternatively, a New Trial Pursuant to Rule 59 Regarding Infringement, *3Com Corporation v. D-Link Systems, Inc.*, Civil Action No. CV-03-02177-VRW, U.S.D.C., N.D. Ca. [Court Doc. 731, pp. 1-25].

Restriction Requirement dated Dec. 17, 1998 issued from parent U.S. Appl. No. 09/028,088, filed Feb. 23, 1998.

Response to Restriction Requirement dated Dec. 17, 1998, filed Feb. 17, 1999, in parent U.S. Appl. No. 09/028,088, filed Feb. 23, 1998.

Office Action dated Oct. 13, 1999 issued from parent U.S. Appl. No. 09/028,088, filed Feb. 23, 1998.

Response to Office Action dated Oct. 13, 1999, filed Jan. 1, 2000, in parent U.S. Appl. No. 09/028,088, filed Feb. 23, 1998.

Office Action dated Mar. 25, 1999 issued from parent U.S. Appl. No. 09/028,088, filed Feb. 23, 1998.

Response to Office Action dated Mar. 25, 1999, filed Jul. 26, 1999, in parent U.S. Appl. No. 09/028,088, filed Feb. 23, 1998.

Notice of Allowance dated Feb. 3, 2000 issued from parent U.S. Appl. No. 09/028,088, filed Feb. 23, 1998.

Office Action dated Sep. 23, 1996 issued from parent U.S. Appl. No. 08/503,797, filed Jul. 18, 1995.
Response to Office Action dated Sep. 23, 1996, filed Jan. 23, 1997, in parent U.S. Appl. No. 08/503,797, filed Jul. 18, 1995.
Supplemental Remarks filed Apr. 23, 1997, in parent U.S. Appl. No. 08/503,797, filed Jul. 18, 1995.
Office Action dated May 9, 1997 issued from parent U.S. Appl. No. 08/503,797, filed Jul. 18, 1995.
Response to Office Action dated May 9, 1997, filed Sep. 9, 1997, filed in parent U.S. Appl. No. 08/503,797, filed Jul. 18, 1995.
Office Action dated Nov. 21, 1997 issued in parent U.S. Appl. No. 08/503,797, filed Jul. 18, 1995.
Response to Office Action dated Nov. 21, 1997, filed Feb. 23, 1998, in parent U.S. Appl. No. 08/503,797, filed Jul. 18, 1995.
Notice of Allowance dated Mar. 11, 1998 issued in parent U.S. Appl. No. 08/503,797, filed Jul. 18, 1995.
Advanced Micro Devices, "The SUPERNET 2 Family for FDDI—1991/1992 World Network Data Book" (1991), pp. iii through 2-10, 2-40, 2-49 through 2-54.
Tamir et al., "Design & Implementation of High-Speed Asynchronous Communication Ports for VLSI Multicomputer Nodes," ISCAS (1988).
Anzilotti et al., "Implementing a Non-Buffered Slave Ethernet Adapter using the Intel 82592," Intel Data Communications Focus Group (Sep. 1989).
Kwok et al., "Cut-Through Bridging for CSMA/CD Local Area Networks," IEEE Transactions on Communications, vol. 38, No. 7 (Jul. 1990).
Siegel, et al. "Overcoming Bottlenecks in High-Speed Transport Systems," IEEE (1991).
Chiang, Al, "An EtherStar is Born", ESD: Magazine, Digital Design Publishing Company, Mar. 1988; 1900 West Park Drive, Westborough, MA 01581.
EtherStar Ethernet/Starlan Controller, Fujitsu MB86950, May 1988.
Notice of Allowance dated Jun. 17, 1995 issued in parent U.S. Appl. No. 08/374,491, filed Jan. 17, 1995.
Office Action dated Oct. 26, 1993 issued in co-owned U.S. Appl. No. 07/920,893, filed Jul. 28, 1992.
Response to Office Action dated Oct. 26, 1993, filed Feb. 23, 1994, in co-owned U.S. Appl. No. 07/920,893, filed Jul. 28, 1992.
Office Action dated Jul. 6, 1994 issued in co-owned U.S. Appl. No. 07/920,893, filed Jul. 28, 1992.
Response to Office Action dated Jul. 6, 1994, filed Oct. 5, 1994, in co-owned U.S. Appl. No. 07/920,893, filed Jul. 28, 1992.
Office Action dated Jan. 14, 1994 issued in parent U.S. Appl. No. 07/907,946, filed Jul. 2, 1992.
Response to Office Action dated Jan. 14, 1994, filed May 12, 1994, in parent U.S. Appl. No. 07/907,946, filed Jul. 2, 1992.
Office Action dated Jul. 7, 1994 issued in parent U.S. Appl. No. 07/907,946, filed Jul. 2, 1992.
Response to Office Action dated Jul. 7, 1994, filed Oct. 7, 1994, in parent U.S. Appl. No. 07/907,946, filed Jul. 2, 1992.
Notice of Allowance dated Oct. 18, 1994 issued in parent U.S. Appl. No. 07/907,946, filed Jul. 2, 1992.
Fickel, Louise, "AMD Chip Set Promises to Bring FDDI Closer to the Desktop", InfoWorld, Jan. 21, 1991, © 1991 IDG Communications, Inc., p. 8, et seq.
"AMD Introduces FDDI Chip for half-size card", The Local Area Network Magazine, Feb. 1991, vol. 6, No. 2, © 1991 Miller Freeman, Inc., p. 18, et seq.
Wilson, Ron, "FDDI chips struggle towards the desktop; Fibert Distributed Data Interface", Computer Design, Feb. 1, 1991, vol. 30, No. 3 © 1991 Pen Well Publishing Company. p. 61, et seq.
Preliminary Specification for the Am79C830A FORMAC Plus Chip Integrated Circuit, Advanced Micro Devices, Jul. 1992, Publication No. 16287, pp. 1-140.
Information Disclosure Statement filed Dec. 17, 1996, in co-owned U.S. Appl. No. 08/715,253, filed Sep. 19, 1996.
Interview Summary dated Dec. 3, 1996 issued in co-owned U.S. Appl. No. 08/715,253, filed Sep. 16, 1996.
Office Action dated Jan. 7, 1997 issued in co-owned U.S. Appl. No. 08/715,253, filed Sep. 16, 1996.
Response to Office Action dated Jan. 7, 1997, filed Apr. 7, 1997, in co-owned U.S. Appl. No. 08/715,253, filed Sep. 16, 1996.
AMD, "The SUPERNET 2 Family FPOR FDDI", 1991/1992 World Network Book, (Oct. 1991), pp. 1-1 to A-4.
Information Disclosure Statement filed Apr. 7, 1997 in co-owned U.S. Appl. No. 08/715,253, filed Sep. 16, 1996.
Terminal Disclaimer Under 37 C.F.R. §1.321(b), 35 U.S.C. §253, With Statement Under 37 C.F.R. §3.73(b) filed Apr. 7, 1997 in co-owned U.S. Appl. No. 08/715,253, filed Sep. 16, 1996.
Notice of Allowance dated Jul. 14, 1997 issued in co-owned U.S. Appl. No. 08/715,253, filed Sep. 16, 1996.
Preliminary Amendment filed Mar. 3, 1995 in co-owned U.S. Appl. No. 08/397,997, filed Mar. 3, 1995.
Information Disclosure Statement filed Aug. 14, 1995 in co-owned U.S. Appl. No. 08/397,997, filed Mar. 3, 1995.
Office Action dated Mar. 19, 1996 issued in co-owned U.S. Appl. No. 08/397,997, filed Mar. 3, 1995.
National Semiconductor, NS 16550A Universal Asynchronious Receiver/Transmitter with FIFOs, 1988.
Kanakia, Hemart and David Cheriton, "The VMP Network Adapter Board (NAB): High-Performance Network Communication for Multiprocessors", ACM, 1988.
Fujitsu, Ltd, Data sheet for "Fujitsu MB86950 Etherstar Ethernet Controller", Dec. 1989.
Texas Instruments, TL16C550A Asynchronous Communications Element, Mar. 1996.
Frazier, Gregory L and Yuval Tariar, "The Design and Implementation of a Multi-Queue Buffer for VLSI Communication Switches", IEEE, 1989.
Intel, Corp, Datasheet for 82596CA High-Performance 32-Bit Local Area Network Coprocessor, Nov. 1989.
Ngai, John L and Charles L. Seitz, "A Framework for Adaptive Routing in Multicomputer Networks", ACM, 1989.
Schroder, Micheal D et al, "Autonet: A High-Speed, Self-Configuring Local Area Network Using Point-to-Point Links", Principals of Computing Systems, Apr. 21, 1990.
Ganssle, Jack G., "Speed Kills", Embedded Systems Programming, Aug. 1990.
National Semiconductor, Data sheet for DP8390C/NS32490C chip, "Data Communications Local Area Network UARTS", 1990.
National Semiconductor, Data sheet for "DP 83265 BSI Device (FDDI System Interface)", Feb. 1991.
Kanakia, HR, Thesis, "High Performance Host Interfacing for Packet-Switched Networks", Stanford University Department of Computer Science, Jul. 1991.
Advanced Micro Devices, Data sheet for "The SUPERNET 2 Family for FDDI", Oct. 1991.
Schroder, Micheal D, et al, "Autonet: A High-Speed, Self-Configuring Local Area Network Using Point-to-Point Links", IEEE Journal on Selected Areas of Communications, Oct. 1991.
Owicki, Susan and Anna Karlin, "Factors in the Performance of the ANI Computer Network", ACM SIGMETRICS and Performance, Jun. 1992.
Motorola, "FDDI System Interface Users Manual, MC68839", 1994.
Texas Instruments Incorporated's Invalidity Contentions Pursuant to Local Patent Rule 3-3 and 3-4, Brief and Exhibits A and B, Civil Action File No. 6:11-cv-491-LED-JDL, Mar. 26, 2012, 690 pages.
Consolidated Amended Invalidity Contentions Pursuant to Patent Local Rules 3-3 and 3-4, Sep. 15, 2011, No. C-10-03481 JW, United States District Court for the Northern District of California, 288 pages.
Consolidated Amended Invalidity Contentions Pursuant to Patent Local Rules 3-3 and 3-4, Sep. 15, 2011, No. C-10-05254 JW, United States District Court for the Northern District of California, 288 pages.
Consolidated Amended Invalidity Contentions Pursuant to Patent Local Rules 3-3 and 3-4, Sep. 15, 2011, No. C-10-03724 JW, United States District Court for the Northern District of California, 289 pages.

* cited by examiner

PROGRAMMED I/O ETHERNET ADAPTER WITH EARLY INTERRUPTS FOR ACCELERATING DATA TRANSFER

This application is a continuation of U.S. patent application Ser. No. 09/488,942, filed Jan. 21, 2000, which is a continuation of U.S. patent application Ser. No. 09/028,088 filed Feb. 23, 1998, now U.S. Pat. No. 6,112,252, which is a continuation of U.S. patent application Ser. No. 08/503,797 filed Jul. 18, 1995, now U.S. Pat. No. 5,872,920, which is a continuation of U.S. patent application Ser. No. 08/374,491, filed Jan. 17, 1995, now U.S. Pat. No. 5,485,584, which is a divisional of U.S. patent application Ser. No. 07/907,946, filed Jul. 2, 1992, now U.S. Pat. No. 5,412,782, the disclosures of which are incorporated herein by reference in their entireties.

FIELD OF THE DISCLOSURE

This invention-relates to the field of local computer networks, more particularly to an Ethernet adapter providing high throughput for hosts of a network.

BACKGROUND

Local Area Networks are becoming increasingly common at the office and in industry, where networking enhances productivity by providing improved sharing of information and specialized equipment. Such networks typically consist of an expensive, high capacity server host computer serving a number of relatively less expensive type 286, 386 or 486 Personal Computers as client hosts through which individuals may access the server and specialized equipment. Each host within the network requires an interface apparatus commonly known as an adapter that performs a role intermediate of the host and network for the reception, buffering and transmission of data by the host.

Critical for the usefulness of the PC clients, which comparatively are minimally endowed with speed and memory resources, is an efficient adapter architecture that can allow network communications to proceed in parallel with other computer operations without excessively slowing those other operations. Also critical to the efficiency of the entire network is a need that the adapter have minimal latency in the reception and transmission of data. At the same time, the adapter must be economical to be suitable for accompanying inexpensive computers.

SUMMARY

According to the invention, in a Local Area Network (LAN), a controller in a CSMA/CD (or Ethernet) adapter for connecting a host computer node to the network that transfers data to and from the host through programmed I/O (PIO) with first-in-first-out (FIFO) buffers, generates interrupts before complete packets have been received from the network (early receive interrupts), so that reception of the remainder of the packet overlaps with the host computer interrupt latency. The invention reduces overall latency in a CSMA/CD network. As a further aspect of the invention, a second early interrupt may be generated during the reception of large packets so that the copying of the packet to the host may overlap the reception of the final portion of the packet. As a still further aspect of the invention, the adapter is allowed to begin packet transmission before the packet is completely transferred from the host to the adapter, which further reduces latency. The receive PIO employs direct memory access (DMA) ring buffer backup so that incoming packets can be transferred directly into host memory (DMA transferred) when the PIO FIFO buffer is full.

The minimal latency of the adapter allows the adapter to employ relatively smaller receive and transmit FIFO buffers which can be contained within RAM internal to an Application Specific Integrated Circuit (ASIC). Specifically, the ASIC may contain the transceiver, ethernet control circuitry, FIFO control circuitry, FIFO RAM buffers and the host interface in one unit. A further understanding of the nature and advantage of this invention may be realized by reference to the remaining portions of the specification and drawings.

DETAILED DESCRIPTION OF PARTICULAR EMBODIMENTS

Figure 1:
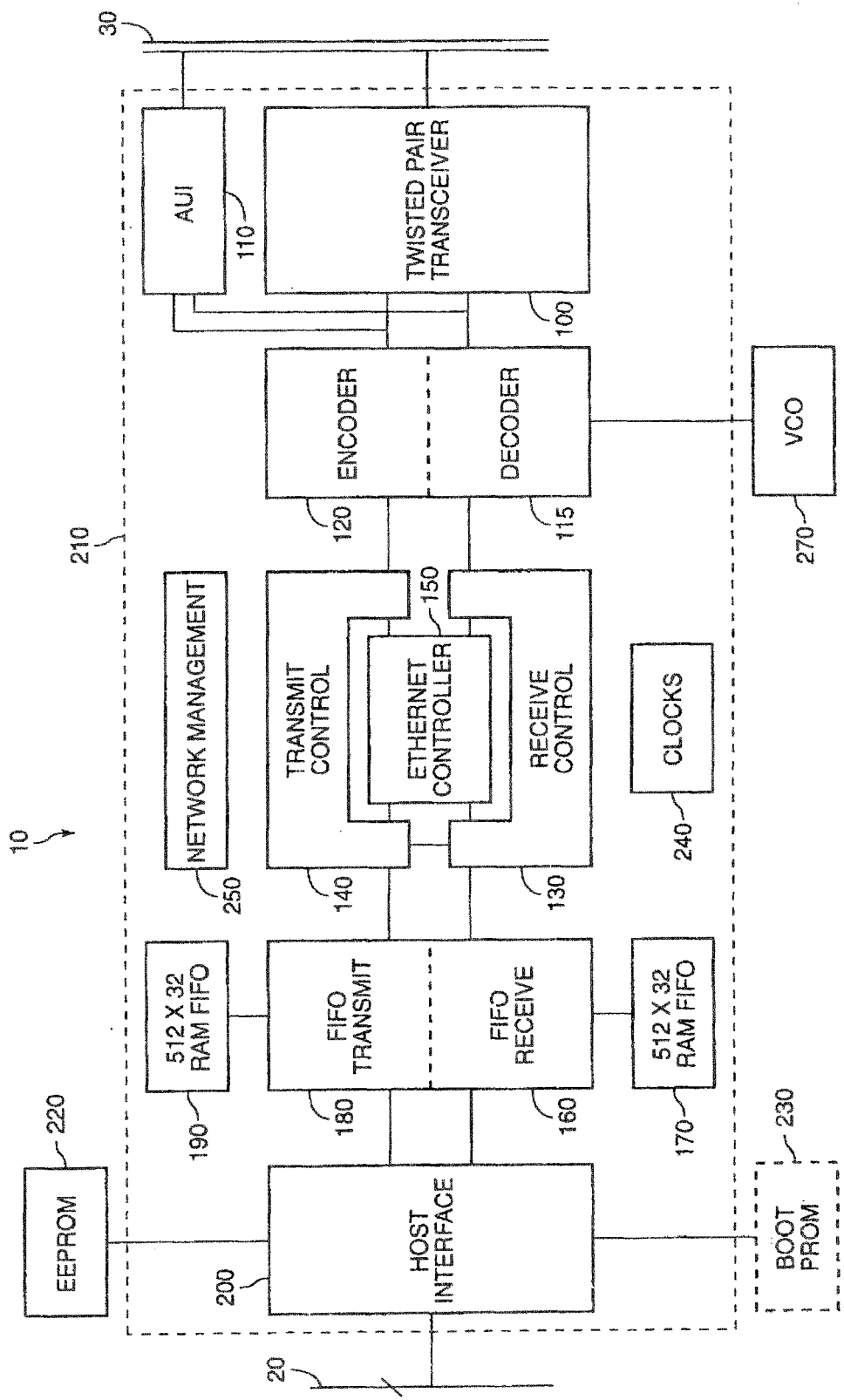
FIG. 1 is a block diagram of an ethernet adapter according to the present invention, for use with twisted pair physical media.

Referring to FIG. 1, a block diagram is shown of an adapter 10 according to the present invention for communications between a client host computer and an ethernet computer network twisted pair wires. Adapter 10 comprises a number of components coupled between a host computer system bus 20 and communications network twisted pair physical media 30. A twisted pair transceiver 100 is coupled in parallel with an Attachment Unit Interface (ADI) 110 between physical media 30 and both decoder circuitry 115 and encoder circuitry 120. Decoder circuitry 115 is coupled to receive control circuitry 130, and encoder circuitry 120 is coupled to transmit control circuitry 140. Receive control circuitry 130 and transmit control circuitry 140 are coupled to each other and are both coupled to and share ethernet control circuitry 150. Ethernet control circuitry 150 may also include an interrupt timer, explained in more detail below. Receive control circuitry 130 is coupled to receive First In First Out (FIFO) circuitry 160, which is in turn coupled to a receive (RX) RAM FIFO 170. Similarly, transmit control circuitry 140 is coupled to transmit FIFO circuitry 180, which is in turn coupled to a transmit (TX) RAM FIFO 190. Receive FIFO circuitry 160 and transmit FIFO circuitry 180 are both coupled to a host interface 200 coupled to host system bus 20. Host interface 200 also includes DMA control circuitry.

The transceiver, control circuitry, and RAM discussed thus far are shown in FIG. 1 enclosed by a dotted line to indicate that this circuitry may all be contained within a single Application Specific Integrated Circuit (ASIC) 210. ASIC 210 also employs an EEPROM 220 coupled to host interface 200 to provide configuration data such as station address, and it may also optionally employ a boot PROM 230 for automatic configuration. Also contained within and employed throughout ASIC 210 are clocks 240 and network management circuitry 250 to manage various network status signals. An external voltage controlled oscillator (VCO) 270 is also coupled to decoder 115 and encoder 120

Figure 2:
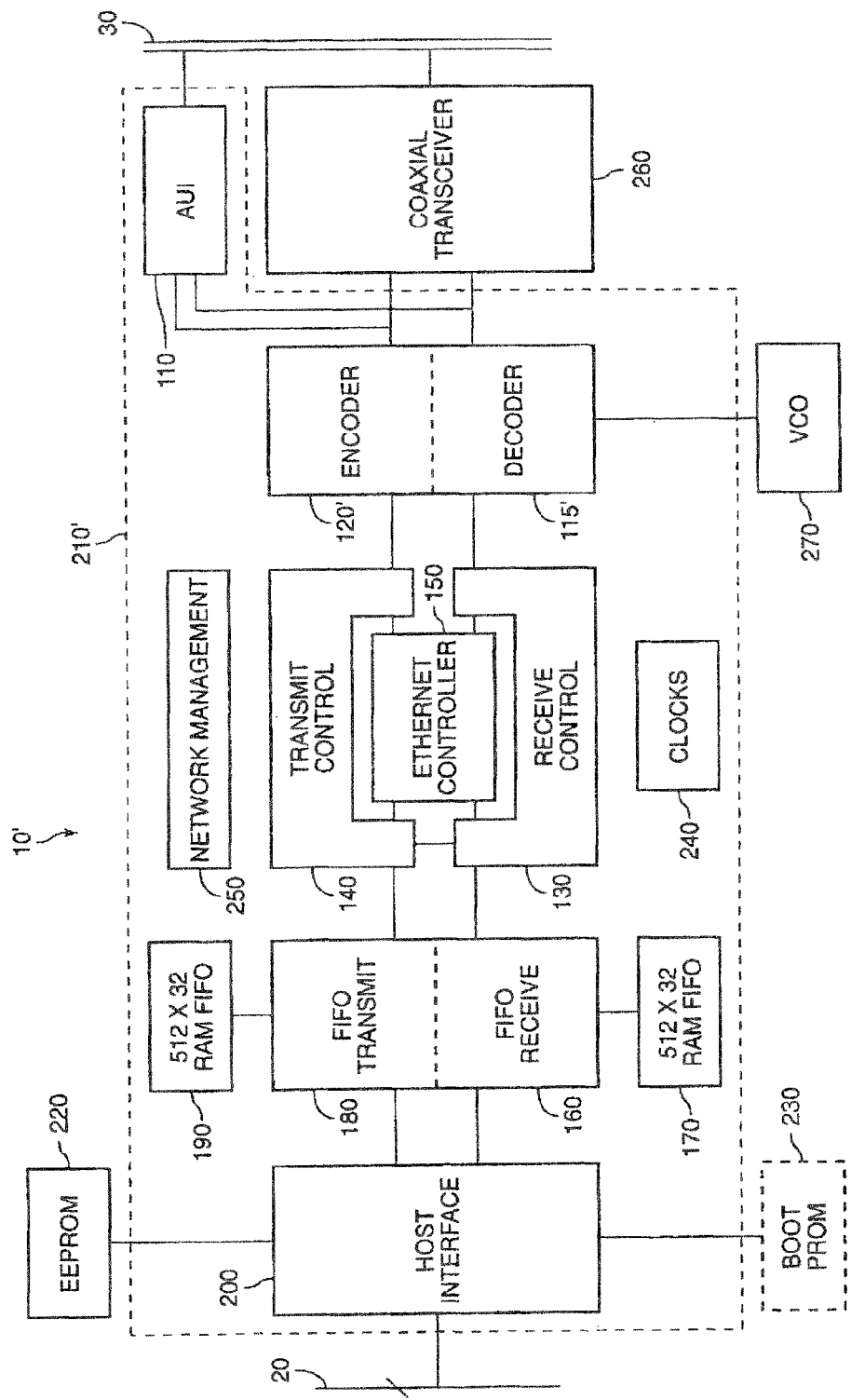
FIG. 2 is a block diagram of an ethernet adapter according to the present invention, for use with coaxial cable physical media.

An alternative configuration for an adapter 10' for networks carried by coaxial cable physical media 30' rather than twisted pair physical media 30 is illustrated in FIG. 2. Adapter 10' employs an ASIC 210' that is substantially identical to ASIC 210, except that it uses an external coaxial transceiver 260 rather than internal twisted pair transceiver 100

Overview of Operation

All data transfer operations between adapter 10 and the host are performed preferably through programmed I/O (PIO), except that a direct memory access (DMA) mode is available as a backup for receive operations. Data is stored by the adapter as double words (4 bytes). As a data packet is received, it is copied into receive FIFO 170, An early receive threshold size is established so that any packet larger than a preselected size triggers the early receive interrupt. If adapter 10 is not provided with or programmed for early receive interrupts, or if the packet is smaller than the early receive threshold size, adapter 10 will wait until the entire packet has been received and then generate an interrupt indicating that a complet packet has been received, that is, a receive complete interrupt, to signal a driver that a complete packet is available for reading. If adapter 10 is provided with or programmed for early interrupts at a particular early receive threshold, an early receive interrupt will be generated once that number of bytes have been received. The driver may then begin reading the data, or for long packets may reprogram the early receive threshold to generate another early receive interrupt once more of the packet has been received.

As a protection against overflow of the receive FIFO, called receive FIFO overrun, a DMA backup mode may be enabled. If the driver is unable to service receive FIFO 170 adequately, such as if other interrupt handlers consume excessive CPU time, DMA backup will be initiated once receive FIFO 170 has less than a receive FIFO free byte threshold number of remaining available bytes. During DMA mode, data is copied directly from the top of receive FIFO 170 into a DMA ring buffer in the host computer memory.

For transmit operations, all data must be moved into transmit FIFO 190 by the driver through PIO. Typically the driver will copy as much of the packet to the adapter as possible. To minimize latency according to the invention, the adapter may begin transmitting the packet before the complete packet has been copied into transmit FIFO 190. If one or more earlier packets yet remain in transmit FIFO 190, there may be insufficient space for the current packet to be completely copied into transmit FIFO 190. In such a case, the driver will set a threshold to indicate that the transmit function is available, called a TX available threshold, specifying a number of bytes to request an interrupt from adapter 10 when the required number of bytes are free in transmit FIFO 190.

Figure 3A:
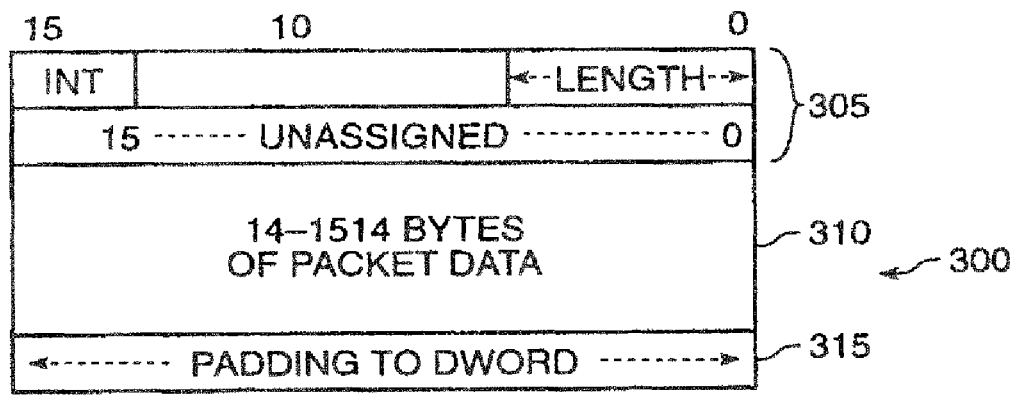
FIGS. 3A and 3B illustrate the structure of transmit data packets and receive data packets, respectively, of a particular embodiment.
Figure 3B:
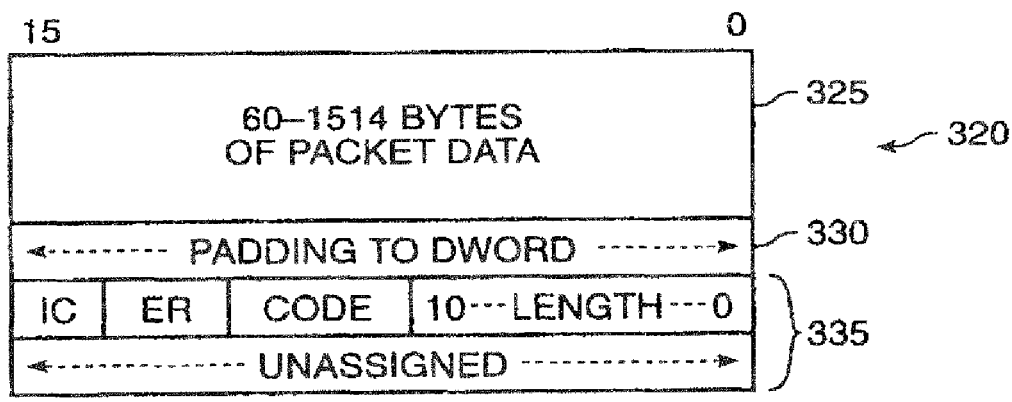

The structure of a specific embodiment of the data packets handled by adapter 10 is illustrated in FIGS. 3A and 3B. FIG. 3A illustrates a transmit packet 300 containing a four-byte preamble 305, 14 to 1514 bytes of packet data 310 (which includes destination and source addresses), and padding 315, which is for extending the length of the data string up to a double word boundary. Preamble 305 contains a 1-bit INT field which specifies whether there should be an interrupt upon successful complete transmission, and an 11-bit length field which specifies the number of bytes of actual unpadded packet data plus two bytes of data reserved for use in a future protocol. Prior to transmission of the packet, preamble 305 is stripped off and replaced with a standard 802.3 preamble.

FIG. 3B illustrates a receive packet 320 as stored in both RX FIFO 170 and in the DMA Ring Buffer if used. Packet 320 contains 60 to 1514 bytes of packet data 325 followed by padding 330 to a double word boundary, followed by a postamble 335. Postamble 335 contains two one-bit flags IN and ER, a three-bit code field, and an 11-bit length field which specifies the number of bytes of actual packet data. The IN flag specifies whether the packet is incomplete. The ER flag indicates whether there was an error in the reception, in which case the code field specifies the type of error. These sixteen bits of the postamble duplicate the RX Status register, described below, and for that reason some embodiments could omit the postamble.

Adapter Control by Driver

Adapter 10 contains numerous registers, some of which may be read by the driver to ascertain the status of adapter 10, others of which may be written to by the driver as commands to control adapter 10, and yet others which are simply used internally by the adapter. In a particular embodiment, these registers are accessed by the driver through a number of eight-word register windows. This method of register access is simply a design choice not critical to the invention, and indeed, many of the commands and registers are not important for an understanding of the invention and need not be described.

Figure 3C:
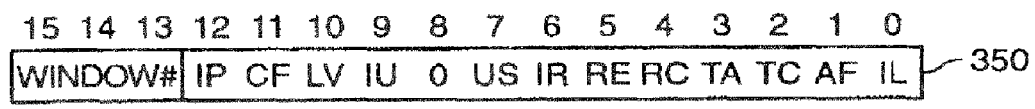
FIGS. 3C, 3D, and 3E illustrate the structure of the adapter status register, the receive status register, and the transmit status register, respectively, of a particular embodiment.

One of the primary registers of adapter 10 is the adapter status register, as illustrated in FIG. 3C and indicated generally by reference numeral 350. Its individual bits are briefly described below. Bits marked with an asterisk (*) cause an interrupt when set, unless masked off.

Bit 0 Interrupt Latch—latched when the adapter raises an interrupt to the host; cleared when acknowledged.
Bit 1 *Adapter Failure
Bit 2 *TX Complete—the adapter has finished transmitting a packet.
Bit 3 *TX Available—the number of bytes in the TX FIFO now exceeds the TX Available Threshold.
Bit 4 *RX Complete—there is a complete packet available in either the RX FIFO or in the host DMA ring buffer.
Bit 5 *RX Early—more than the RX early threshold, but not all, bytes of the current packet have been received.
Bit 6 *Interrupt Requested—set when the driver commands the adapter to generate an interrupt.
Bit 7 *Update Statistics—used for statistics tracking.
Bit 8 (Always zero)
Bit 9 host DMA ring buffer In Use—indicates the host DMA ring buffer is not empty.
Bit 10 host DMA ring buffer Last Valid—explained below.
Bit 11 (Reserved)
Bit 12 Command In Progress—the last command is still being processed by the adapter.
Bits 13-15 Window Number (0-7)

Figure 3D:
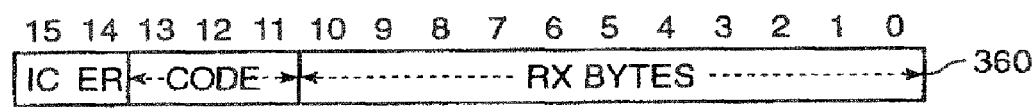
Figure 3E:
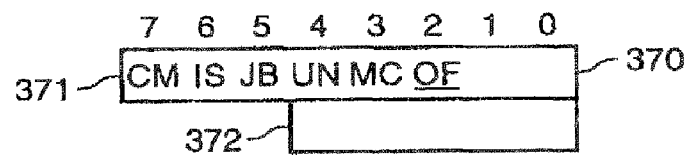

There are also individual status registers for the receive and transmit FIFOs. The RX status register, as illustrated in FIG. 3D and indicated generally by reference numeral 360, contains two one-bit flags, IC and ER, a three-bit error code, and an 11-bit field, called RX Bytes, containing the receive packet length, which can range from 0 to 1514. References below to RX Bytes should be understood to be to the value contained in the RX Bytes field. Flag IC indicates that the top packet is incomplete or that RX FIFO 170 is empty. Flag ER indicates an error occurred, the type of which is specified in the code field. RX status register 360 is a ripple through FIFO that advances one position when the last byte of a received packet is read from RX FIFO 170. A packet becomes visible in RX status register 360 once either the minimum of 60 bytes have been stored in RX FIFO 170 or the RX Early Threshold has been exceeded. If an error is signalled in the packet before this point, the packet is discarded. If an error occurs after this point, the packet's status will appear in RX status register 360 flagged with an error.

As the packet is received into RX FIFO 170, RX Bytes is incremented. Once the packet has been completely received, the postamble, described above, is written to RX FIFO 170. If the packet is not read from RX FIFO 170 until the incomplete bit is cleared, RX Bytes will show the packet length (assuming there were no errors). As bytes of a packet are read from RX FIFO 170, RX Bytes is decremented. This can be done before the packet has been completely received, in which case RX Bytes shows the number of packet bytes stored in RX FIFO 170. When reading past the end of the packet data, into the postamble, the value RX Bytes is decremented to negative numbers. Reading packet bytes from RX FIFO 170 prior to complete packet reception can be initiated after an initial early receive interrupt through either programming a second early receive interrupt or by simply waiting a period time after the first interrupt. It should also be noted that at any time the driver can issue an RX discard command and the packet will be discarded from RX FIFO 170.

The TX status register, illustrated in FIG. 35 and indicated generally by reference numeral 370, is treated as if stacked in a similar manner to the RX status register. However, it is actually implemented as a pseudo-stack comprising a register of status flags 371 and a five bit counter 372, as opposed to a true stack of status flag registers. The use of such a pseudo-stack is possible because transmission stops upon any transmission error, and does not resume until the error status is popped from the status register. Any sequence of N transmissions would therefore be a string of N−1 successful transmissions followed by the Nth transmission which may or may not have been successful. Status flags 371 store the status of the Nth transmission, and counter 372 stores N, the number of transmissions in the stack. At a new packet transmission the adapter increments counter 372 and updates flags 371 as necessary. Popping TX status register 370 results in counter 372 being automatically decremented. When the contents of TX status register 370 are accessed, if the count is greater than one, then the regular successful status bits are forced on the bus. If the count is equal to one, then the contents of status flags 371 are applied to the bus, indicating the status of the most recent transmission. If the count is equal to zero, then TX status register 370 is indicated as being empty by applying zeros to the bus.

The flags 371 are a transmission complete flag, a flag specifying whether an interrupt should be generated on successful completion of transmission, and several error flags. Whenever the driver reads TX status register 370 and the TX completed bit is set, the stack is popped, and the next TX status may be read, if any. Popping everything off this stack turns off the TX Complete interrupt bit in adapter status register 350, described above. When the completion of a packet is signalled to the host, the packet has already been discarded from TX FIFO 190. If an error occurred and the packet needs to be retransmitted, it must be copied to TX FIFO 190 again. If the error occurred while the packet was still being copied to the adapter, the host should continue copying the packet to the 720 adapter. When completely copied to the adapter, the packet will be discarded.

Packet Transmission

Figure 4A:
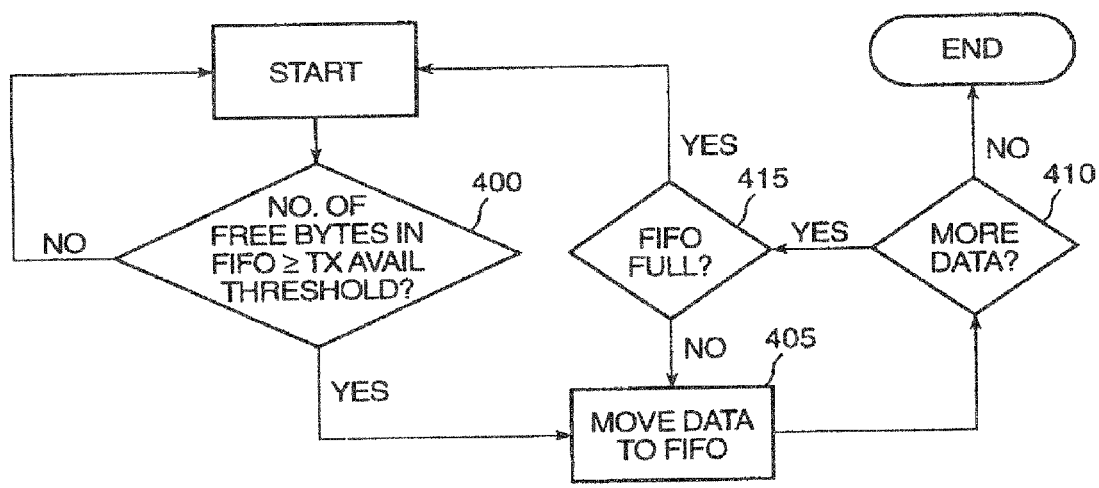
FIGS. 4A and 4B are a flow chart illustrating the transmit process with early transmit interrupts.
Figure 4B:
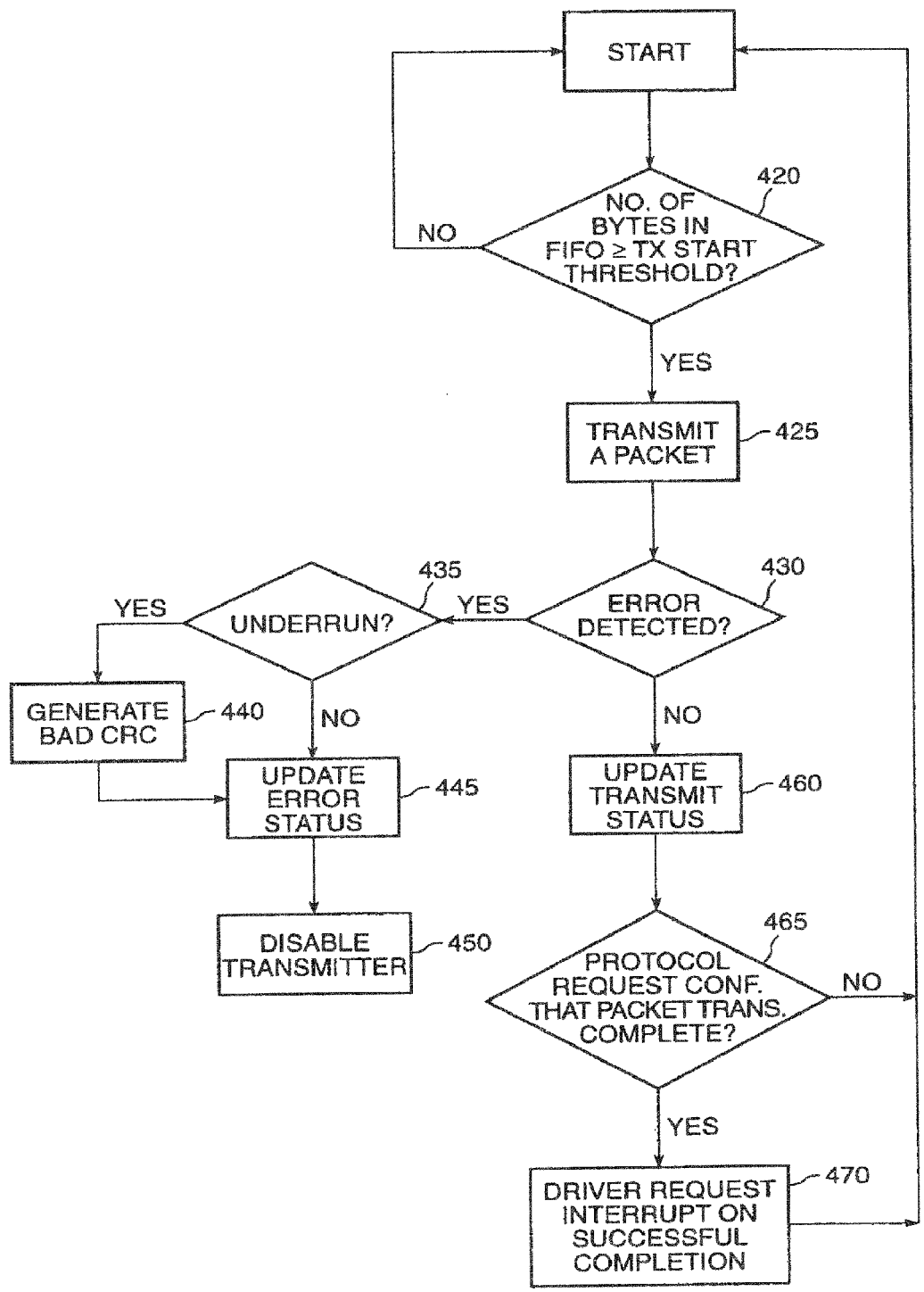

The basic transmission procedure is performed by the adapter as two independent processes, illustrated by the flow charts of FIGS. 4A-B. FIG. 4A illustrates the process performed by the driver when there is packet data to be copied to the adapter, and FIG. 4B illustrats the process performed by the adapter when transmitting packets on the physical medium. As shown in FIG. 4A, the driver first compares at step 400 the number of free bytes in TX FIFO 190 against a TX available threshold. This comparison may be done by polling by the driver, or a TX Available Threshold command may be performed so that the adapter will issue an interrupt when the TX Available Threshold is met. Control remains at this comparison until the TX Available Threshold is met. When the TX Available Threshold is met, control passes to step 405, at which a block of data is copied by the driver into TX FIFO 190. Next, at step 410, it is determined if more data remains to be copied to the adapter. If not, the process ends until the driver has more packet data to be copied to the adapter. If more data remains, control proceeds to step 415, at which TX FIFO 190 is examined to determine if it is full. If TX FIFO is not full, control passes again to step 405. Otherwise, control returns to step 400. If the packet length specified in packet preamble 305 is less than 60 bytes, the adapter will pad the packet to the 60 byte minimum. Multiple packets can be stored in TX FIFO 190 by employing the process of FIG. 4A.

FIG. 4B illustrates the process by which packets are transmitted from TX FIFO 190 to the physical medium. In step 420 it is determined if the number of bytes in TX FIFO 190 is at least equal to a TX start threshold. The TX start threshold may be varied by the driver to reduce the likliehood of transmit underruns. Control remains at this step until the TX start threshold is met, at which time control passes to step 425. At step 425 the adapter begins to transmit a packet from TX FIFO 190 and continues until the entire packet has been transmitted or an error has occurred, at which point control passes to step 430. At step 430 it is determined if an error was detected during transmission. If so, control passes to step 435 at which it is determined if the error was an underrun error. If the error was an underrun error, then a "bad" CRC is intentionally generated at step 440. If the error was not an underrun, or after a bad CRC is generated, control passes to step 445 where the error status is updated, and next to step 450 where the transmitter is disabled. If at step 430 no error was detected, control passes from there to step 460, at which the transmit status is updated. Next, at step 465, the software protocol (driver) is checked to determine if whether an acknowledgement that packet transmission is complete is required. If not, control returns to start again at the loop of step 420 to await transmission of the next packet. If an acknowledgement is required, at step 470 the driver requests from the adapter an interrupt on successful completion of the next packet transmission, after which control passes to the loop of step 420.

Transmission underruns are generally the result of high interrupt latencies, which are beyond the control of the driver. If a packet underruns, the driver may want to guarantee that the retransmitted packet will not underrun again. This can be done by adjusting the TX start threshold to an amount larger than the packet, so transmission will not begin until the packet is completely copied into the adapter.

A programmable TX Available Threshold is provided by the driver to the adapter to cause the adapter to generate an interrupt when the specified number of bytes become available in TX FIFO 190. This allows the driver to return and continue copying the data into the adapter at a later time when some of the data in TX FIFO 190 has been transmitted. If TX Available is used with a specified amount less than the size of the next packet to be transmitted, and only a portion of the packet is copied into TX FIFO 190, the driver may want to adjust the early TX threshold to larger than that portion of the packet, to prevent an underrun. This decision may be based upon whether the size of the packet portion in TX FIFO 190 is larger than the amount that can be transmitted during the expected interrupt latency.

Packet Reception by Adapter

Figure 5:
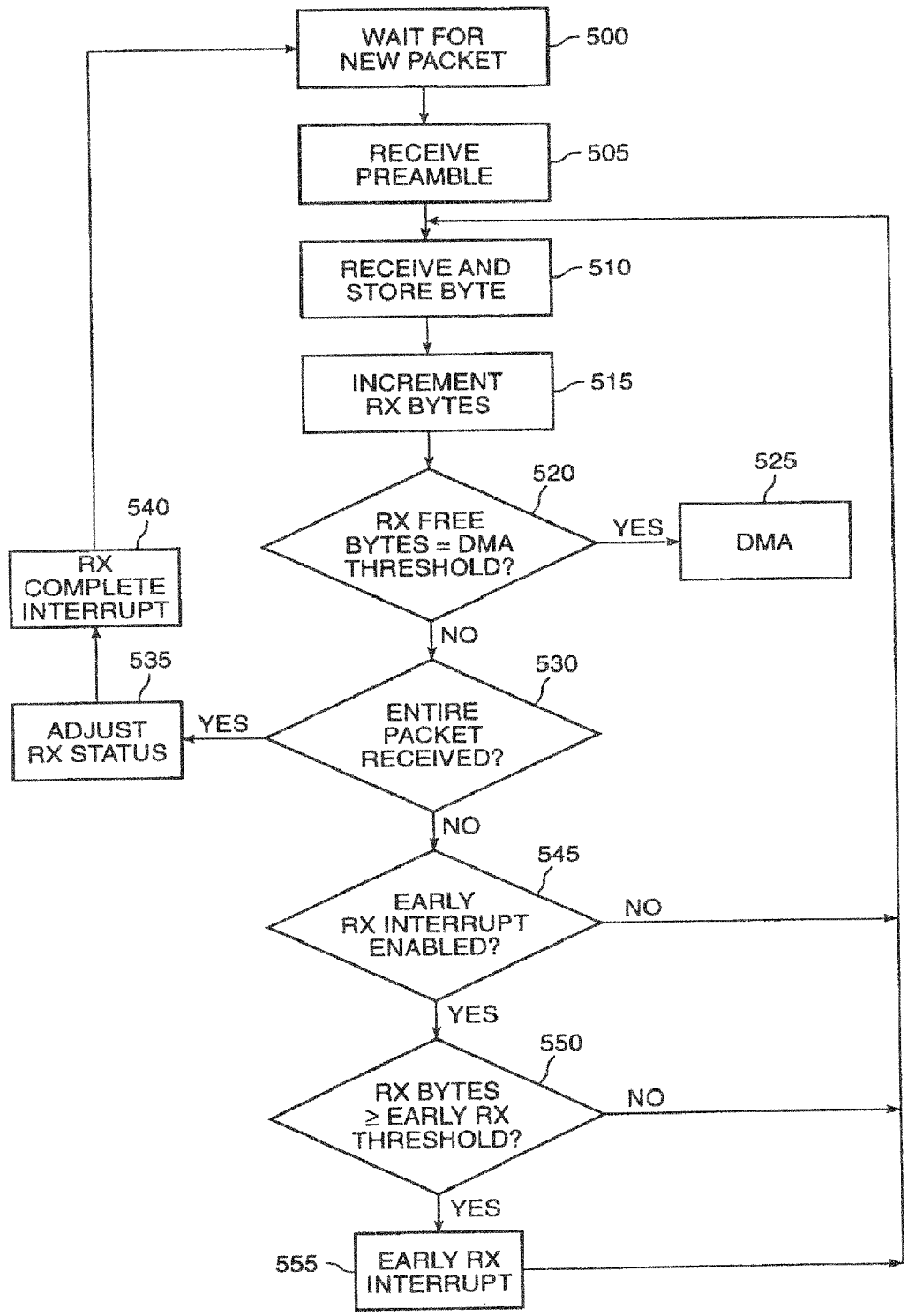
FIG. 5 is a flow chart illustrating the adapter receive process with early receive interrupts.

Illustrated by the flow chart of FIG. 5 is the basic receive procedure performed by the adapter. The process begins in step 500, where the adapter waits for the beginning of a new packet to be received, after which control passes to step 505. In step 505 the packet 802.3 preamble is received and then discarded by the controller. Next, in step 510 the next byte of the packet is received and stored in RX FIFO 170, after which RX Bytes is incremented in step 515. As mentioned above, the partially received packet, and its associated status values, will not become visible to the driver until RX Bytes reaches the sixty byte minimum or exceeds the RX Early Threshold.

Subsequently, in step 520, if DMA backup is enabled, RX Free, the number of free bytes remaining in RX FIFO 170, is compared to the DMA threshold. If insufficient bytes remain in free, then control passes to step 525, where the DMA process is begun (described in more detail below). If sufficient bytes remain, control passes to step 530.

At step 530 it is determined whether the entire packet has been received. If so, execution passes to step 535, where the RX status register is adjusted accordingly, after which an RX Complete interrupt is generated in step 540 before returning to step 500. If the entire packet had not been received at step 520, execution passes to step 545, where the Early RX interrupt enablement is examined. If not enabled, control returns to step 510 to receive more of the packet. If Early RX interrupts are enabled, then control passes from step 545 to step 550, at which RX Bytes is compared to the Early RX threshold. If RX Bytes is less than the Early RX threshold, then control returns to step 510. Otherwise, control passes to step 555 at which an Early RX interrupt is generated to signal the driver that it may begin copying the packet to the host. After step 555, control returns to step 510.

DMA Backup During Receive

DMA backup of PIO copying of data from RX FIFO 170 to the host is advantageous because the host CPU may become overly delayed by other interrupts and unable to service RX FIFO 170 quickly enough. The DMA backup employs a DMA Ring Buffer consisting of a contiguous block of memory between 256 and 16K bytes in length, located in the host memory and accessed through system bus 20. The DMA circuitry, contained within host interface 200, is set up once during initialization, if DMA backup is selected, to access a DMA channel to the DMA ring buffer in host memory. The DMA channel is programmed to transfer data into the receive ring in a manner causing it to automatically wrap around at the end of the DMA ring buffer space. Packets stored in the DMA ring buffer have the same structure as those in RX FIFO 170.

If DMA mode is initiated, the DMA controller will begin copying bytes from the top of RX FIFO 170 into the DMA ring buffer, while receive circuitry 130 may be continuing to add data to the bottom of RX FIFO 170. The DMA controller preferably copies bytes into the DMA ring buffer at a slightly faster rate than receive circuitry 130 adds bytes to RX FIFO 170. Three registers are maintained to provide necessary information to the driver: the host DMA ring buffer Read index, the host DMA ring buffer Write index, and the host DMA ring buffer Last index. The host DMA ring buffer Read index specifies the address of the next byte to be read from the DMA ring buffer by the driver. This register is only writable by the driver and must be maintained by it. The host DMA ring buffer Write index specifies the address to which the next byte will be written by the DMA controller. If the host DMA ring buffer Read index equals the host DMA ring buffer Write index, the DMA ring buffer is empty. A full condition is reached when the host DMA ring buffer Write index comes sufficiently close to the host DMA ring buffer Read index that the next DMA transfer (typically a burst of four or eight bytes) would cause the two to collide on the network. The host DMA ring buffer Last index specifies the address of the last receive packet postamble copied into the DMA ring buffer. Normally, no more than one complete packet would be present in the DMA ring buffer, although the host DMA ring buffer Last index, together with the length specified in the pointed-to postamble, can be used to trace through a series of packets in the DMA ring buffer. It should be noted that operations involving DMA ring buffer addresses should be performed modulo the DMA ring buffer size, so as to properly wrap around at the DMA ring buffer space limits.

Copying of Received Data by Driver

When the driver responds to a Receive Complete interrupt or an Early Receive interrupt, it first checks the host DMA ring buffer In Use bit of the adapter status register. If the DMA ring buffer is in use, the driver should first empty the DMA ring buffer before disabling DMA and then servicing RX FIFO 170.

Otherwise, if the DMA ring buffer is not in use and the driver is responding to a Receive Complete interrupt for a valid packet, it simply begins copying the packet to the host. A packet with an error is discarded.

Figure 6:
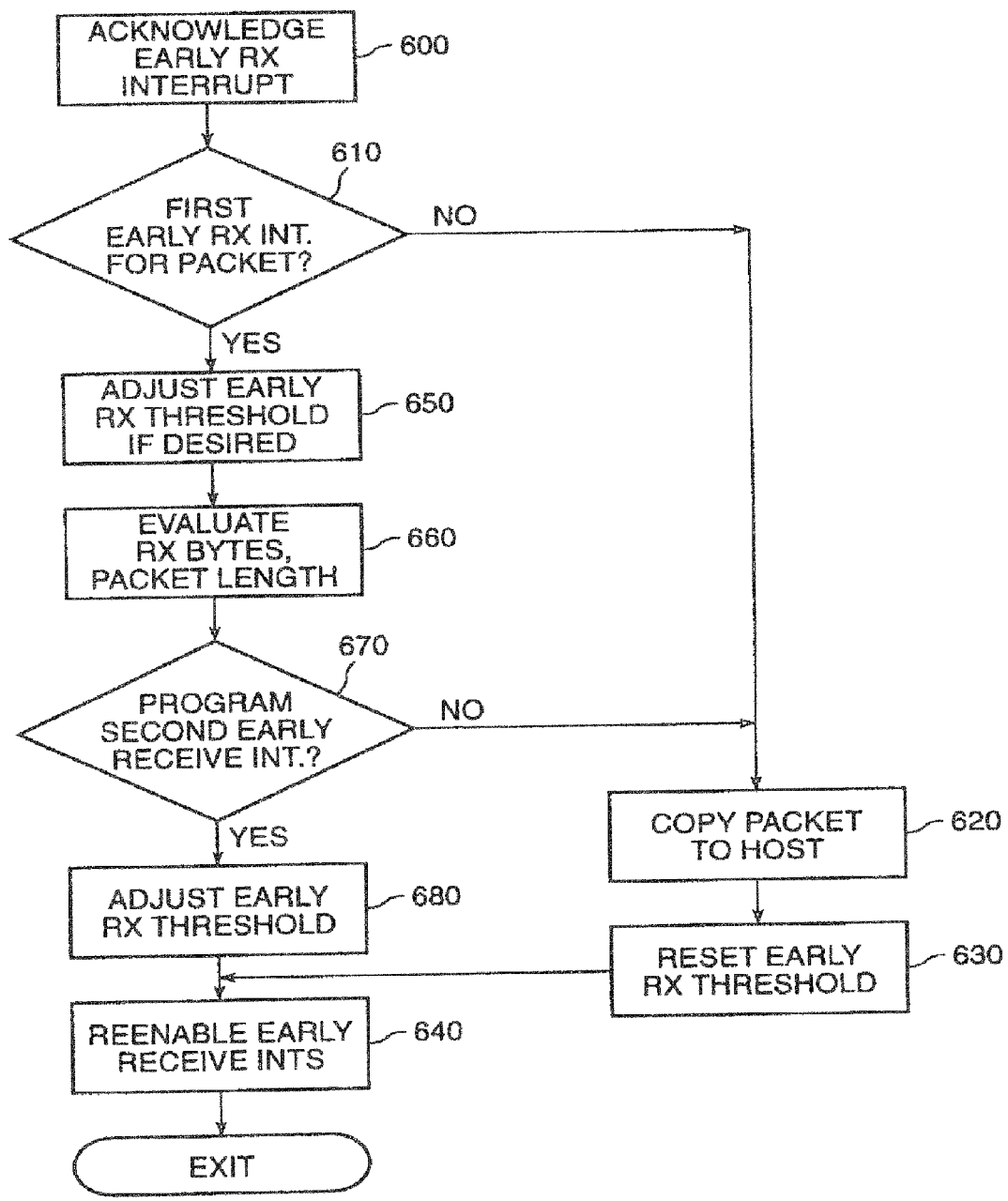
FIG. 6 is a flow chart illustrating the driver process in response to an early receive interrupt.

If the driver is responding to an Early Receive interrupt, it follows the procedure illustrated by the flow chart of FIG. 6. In step 600 the Early Receive interrupt is acknowledged, which disables further Early Receive interrupts. Next, in step 610, it is determined if this is the first Early Receive interrupt for this packet. This can be done by comparing the adapter's Early Receive threshold to an Early Receive threshold value maintained by the driver. If the latter is smaller, then the adapter had been programmed for a second Early Receive interrupt for this packet, in which the packet should be ready for copying to the host, and control passes to step 620. After the packet is copied to the host in step 620, control proceeds to step 630, where the Early Receive threshold is reset to the value maintained by the driver. Next, Early Receive interrupts are re-enabled in step 640, and the driver exits.

If in step 610 it was indicated that this was the first Early Receive interrupt for this packet, control passes to step 650. If the host computer protocol allows early packet indications, then in step 650 the driver compares RX Bytes to the early lookahead size of the protocol to determine if the Early Receive threshold properly accounts for the CPU's interrupt latency. If the two compared values differ by a significant amount, the Early Receive threshold is adjusted accordingly, and at this point the early lookahead portion of the packet is copied to a dedicated early lookahead buffer for the protocol. The interrupt timer incorporated into ethernet control circuitry 150 may instead be used to determine whether the Early Receive threshold should be adjusted (and may be used to determine a need for similar adjustments to the Early Transmit interrupt). Next, in step 660, RX Bytes is compared to the packet length specified in the RX Status register. If the packet has a substantial number of bytes remaining to be received, such that the driver would empty RX FIFO 170 significantly before the last portion of the packet was completely received, in step 670 it is determined to program the adapter for a second Early Receive interrupt, and control passes to step 680. In step 680 the adapter is programmed for an Early Receive threshold equal to the length of the packet less the number of bytes that would be received during the interrupt latency. After step 680, execution passes to step 640, described above.

The invention has now been explained with reference to specific embodiments. Other embodiments will be apparent to those of ordinary skill in the art. It is therefore not intended that this invention be limited, except as indicated by the appended claims.

What is claimed is:

1. An apparatus comprising:
    a host computer comprising a system bus; and
    a data communications adapter comprising:
        Ethernet control circuitry;
        a host interface coupled to said system bus and configured to exchange data with said host computer via said system bus;
        a transceiver coupled to receive and transmit data over communications media;
        data transmit control circuitry responsive to said Ethernet control circuitry and coupled to said transceiver, to a transmit data buffer, and to said host interface, for generating a packet transmit signal causing said transceiver to begin transmitting data from said transmit data buffer over said communications media;
        a receive data buffer coupled to said host interface; and
        data receive control circuitry responsive to said Ethernet control circuitry and coupled to said transceiver, to said receive data buffer, and to said host interface, for storing data received by said transceiver in said receive data buffer, and for generating a receive interrupt signaling to said host computer that data has been received by said transceiver, wherein said data receive control circuitry is operative to generate said receive interrupt once said transceiver has received over said communications media a predetermined number of bytes of a data packet that is less than all of said data packet, wherein said Ethernet control circuitry, said host interface, said data receive control circuitry, said data transmit control circuitry, said receive data buffer, and said transmit data buffer are all contained in a single Application Specific Integrated Circuit (ASIC).

2. The apparatus of claim 1, wherein said data receive control circuitry is programmable.

3. The apparatus of claim 1, wherein said data transmit control circuitry is programmable to generate said packet transmit signal when said transmit data buffer contains the predetermined number of bytes of the data packet that is less than all of said data packet.

4. The apparatus of claim 1 wherein the receive data buffer is a ring buffer connected to the host interface via a DMA channel.

5. The apparatus of claim 1 wherein said host interface is coupled to said host computer.

6. A method performed on a host computer of transferring a packet of data from a computer network communications media through an adapter to a system bus coupled to a central processing unit (CPU) of the host computer, said method comprising the steps of:
    receiving from said computer network communications media through a transceiver and storing in an adapter receive buffer a predetermined first receive threshold number of bytes of said packet of data;
    generating a first early receive interrupt from said adapter to said CPU via the system bus;
    adjusting said first receive threshold number of bytes according to a length of said packet of data;
    continuing to receive from said computer network communications media through said transceiver and store in the adapter receive buffer bytes of said packet of data;
    thereafter generating a second early receive interrupt from said adapter to said CPU via the system bus, prior to complete reception of said packet of data; and
    storing from said communications media through said transceiver and storing in said adapter receive buffer a remainder of said packet of data;
    wherein said host computer employs a driver allowing for early indications and having an early lookahead size associated with the predetermined first receive threshold number of bytes.

7. The method of claim 6, further comprising, after the step of generating said first early receive interrupt, the steps of:
    a) evaluating the number of bytes stored in said adapter receive buffer against said early lookahead size; and
    b) adjusting said first receive threshold number of bytes if said evaluating step does not indicate substantial equality.

* * * * *